United States Patent [19]
Harms et al.

[11] Patent Number: 6,057,831
[45] Date of Patent: May 2, 2000

[54] TV GRAPHICAL USER INTERFACE HAVING CURSOR POSITION INDICATOR

[75] Inventors: Kevin Harms; Donald Gillespie, both of San Jose; Eric Wood, Pleasanton; Kiet Khauv, San Jose, all of Calif.

[73] Assignee: Samsung Electronics Co., Ltd., Suwon, Rep. of Korea

[21] Appl. No.: 08/897,826

[22] Filed: Jul. 21, 1997

Related U.S. Application Data

[60] Provisional application No. 60/023,904, Aug. 14, 1996, Pat. No. 4,249,327.

[51] Int. Cl.[7] .............................. H04N 5/50; H04N 5/445
[52] U.S. Cl. ............................................ 345/327; 348/906
[58] Field of Search ................................... 345/327, 328, 345/145, 146; 348/906, 552, 731, 563, 569, 570, 732, 734

[56] References Cited

U.S. PATENT DOCUMENTS

| | | | |
|---|---|---|---|
| 5,512,955 | 4/1996 | Toyoshima et al. | 348/569 |
| 5,737,028 | 4/1998 | Bertram et al. | 348/563 |
| 5,838,300 | 11/1998 | Takagi et al. | 345/145 |
| 5,886,690 | 3/1999 | Pond et al. | 345/327 |
| 5,929,932 | 7/1999 | Otsuki et al. | 348/569 |
| 5,933,141 | 8/1999 | Smith | 345/339 |

*Primary Examiner*—Andrew I. Faile
*Assistant Examiner*—Ngoc Vu
*Attorney, Agent, or Firm*—Kenneth L. Sherman, Esq.; Sherman & Sherman; Jeffrey P. Aiello, Esq.

[57] ABSTRACT

A TV graphical user interface includes a graphical channel changer for enabling a user to select a required TV channel among about 1000 channels provided by a satellite TV system. The graphical channel changer contains a vertical channel bar composed of channel boxes that display numbers and logos of selected TV channels. To switch the TV set to a required TV channel, the user directs the pointing device at the graphical channel box that indicates the required channel. A direct access channel bar is arranged on a screen so as to cause the channel boxes to display the number and logo of a selected TV channel when the user directs the pointing device at the point on the direct access bar that represents the selected channel. The direct access channel bar is provided with an absolute cursor position indicator that indicates to the user the numbers of TV channels represented by various points on the direct access channel bar, when the user moves the pointing device over these points. When TV channels in the channel changer are arranged in alphabetical order of channel or program names, the absolute cursor position indicator indicates the first letter in the name of a TV channel or program represented by a point on the direct access bar, at which the pointing device is directed.

20 Claims, 9 Drawing Sheets

FIG. 3

| CLUT location | Red byte | Green Byte | Blue Byte | Output Color |
|---|---|---|---|---|
| $0 | $0 | $0 | $0 | Black |
| $1 | $ff | $0 | $0 | Full Red |
| $2 | $80 | $0 | $0 | Half Red |
| $3 | $40 | $0 | $0 | Dim Red |
| $4 | $ff | $ff | $ff | White |
| $5 | $80 | $80 | $80 | Med. gray |
| $6 | $00 | $ff | $00 | Full Green |
| $7 | $00 | $00 | $ff | Full Blue |
| $8 | $00 | $ff | $ff | Cyan |
| etc | etc | etc | etc | etc |

Implements of Direct Access Functionality with alphabetic "hint" in Direct Access Bar

TV GRAPHICAL USER INTERFACE HAVING CURSOR POSITION INDICATOR

This application claims the benefit of U.S. Provisional Application Ser. No. 60/023,904 filed Aug. 14, 1996 now U.S. Pat. No. 4,249,327.

TECHNICAL FIELD

The present invention relates to television (TV) systems, and in particular, to a novel TV graphical user interface (GUI) having a cursor position indicator that enables a user to accurately select a TV channel on a direct access bar.

BACKGROUND ART

The growing availability of TV broadcast and interactive services creates a need for a new type of a TV control system that would facilitate user access to options offered by TV program providers. For example, direct broadcast satellite services require users to make their selection among about a thousand TV channels with various TV programs and services. Direct television satellite broadcasting is provided via direct broadcast satellites at an uplink frequency of 17.3 to 17.9 GHz and a downlink frequency of 12.2 to 12.7 Ghz.

A digital satellite television system for direct television broadcasting includes a transmitter for transmitting television signals including video and audio components to a satellite. The satellite retransmits the received television signals to an outdoor antenna assembly that includes a dish-like antenna and a block converter. The dish-like antenna directs the received television signals to the block converter that converts the frequencies of the received television signals to respective lower frequencies.

The television signals produced by the block converter are connected via a coaxial cable to an indoor satellite receiver coupled to a TV set. The satellite receiver tunes, demodulates and otherwise processes the received television signals to provide video and audio signals with a NTSC, PAL or SECAM format suitable for processing by the TV set that produces an image on a display screen in response to the video signals, and an audible response by means of speakers in response to the audio signals.

Within the transmitter, analog video and audio signals are converted to respective digital signals compressed according to the Motion Picture Expert Group (MPEG) encoding standard. The resultant digital signals are represented by a stream of packets including error correction data. The type of packets is identified by a header code. Packets corresponding to control data may also be added to the packet stream.

In the MPEG standard, the video information may be transmitted in the form of a luminance (Y) component and two color difference (U and V) components. For example, the first color difference component may represent the difference between the red image information and the luminance image information (R-Y), and the second color difference component may represent the difference between the blue image information and the luminance image information (B-Y). In addition, the color information is compressed because the two color difference components correspond to more than one picture element. The use of color difference components and the sharing of the color difference components between picture elements reduces the transmission bandwidth.

The digital information resulting from the compression and error correction encoding is modulated on a carrier using Quaternary Phase Shift Keying (QPSK) modulation and transmitted to a satellite for retransmission.

The satellite receiver comprises a tuner for selecting the appropriate carrier signal retransmitted by the satellite and for converting the frequency of the selected carrier to an intermediate frequency (IF) signal. A QPSK demodulator demodulates the IF signal and supplies it to an error-correcting decoder to correct demodulated packets representing video and audio information. An MPEG decoder decodes and decompresses video and audio packets to form digital video and audio signals supplied to a TV set. A TV set-top box serves to deliver compressed digital video and audio signals in real time usable form to one or more TV sets.

A TV program guide presenting a list of available TV programs and services may be displayed on a TV screen to facilitate user access to TV programs and services.

Inasmuch as a satellite TV system may contain about 1000 TV channels, a TV system of the present invention displays a direct access channel bar on a TV screen to represent TV channels available in the system. The user is enabled to select a list of programs carried by a required TV channel by pointing at the region of the channel bar that corresponds to the required TV channel. However, as the size of the direct access channel bar is limited, regions on the bar corresponding to adjacent TV channels are separated by so a small distance that it may be difficult to distinguish a required TV channel when a pointing device is directed at the region of the channel bar that represents TV channels surrounding the required TV channel.

Accordingly, it would be desirable to provide a TV graphical user interface having a cursor position indicator that indicates a TV channel corresponding to a region on the channel bar, at which the pointing device is currently directed.

Also, it would be desirable to enable a user to distinguish a required TV channel among TV channels sorted in order of channel numbers, as well as among TV channels arranged in order of channel or program names.

DISCLOSURE OF THE INVENTION

One advantage of the present application is in providing a TV graphical user interface (GUI) that has a cursor position indicator for indicating a TV channel corresponding to a region on a direct access channel bar, at which the pointing device is currently directed.

Another advantage of the present application is in providing a TV GUI that enables a user to distinguish a required TV channel among TV channels sorted in order of channel numbers, as well as among TV channels arranged in order of channel or program names.

The above and other advantages of the invention are achieved, at least in part, by providing a television system that comprises a CPU, and a TV monitor controlled by the CPU for displaying a graphical user interface. A channel changer on a TV screen includes channel objects for identifying TV channels. The TV system switches to a required TV channel when the user points a pointing device at a channel object identifying the required TV channel. A direct access channel bar adjacent the channel changer indicates a list of TV channels available in the TV system. The channel object displays identification data of a selected TV channel when the user activates the pointing device directed at a region on the direct access channel bar representing the selected TV channel. An absolute cursor position indicator indicates the selected TV channel when the user directs the pointing device at the region on the direct access channel bar that represents the selected TV channel.

In accordance with one aspect of the invention, the absolute cursor position indicator indicates the number of the selected TV channel when the list of TV channels is arranged in order of channel numbers.

In accordance with another aspect of the invention, the absolute cursor position indicator indicates the first letter in the name of the selected TV channel when the list of TV channels is arranged in alphabetical order of channel names.

In accordance with a further aspect of the invention, the absolute cursor position indicator indicates the first letter in the name of a program carried by the selected TV channel when the list of TV channels is sorted according to names of programs carried by the TV channels.

The absolute cursor position indicator may be arranged on the direct access channel bar having a graduated scale representing TV channels. The direct access channel bar may change its color when the pointing device is held in its direction.

The channel objects may identify numbers and logos of the TV channels. An RF tuner may switch to a frequency of a required TV channel, when the user directs the pointing device at the channel object that identifies the required TV channel.

The GUI may further comprise an electronic TV program guide that contains a schedule of TV programs for a predetermined time period for TV channels defined by the channel objects. The electronic TV program guide may be aligned with the channel changer.

In accordance with a method of the present invention, the following steps are carried out to identify a selected group of TV channels:
  checking a position of a cursor moved by a pointing device,
  detecting when the cursor is positioned over a direct access object that represents available TV channels,
  determining a coordinate of the cursor,
  calculating a position of the cursor relative to the direct access object,
  determining a nearest TV channel corresponding to the relative position,
  displaying identification data of the nearest TV channel, and
  activating the pointing device to redraw channel objects so as to identify the selected TV channel group that includes the nearest TV channel.

If the list of TV channels is arranged in order of channel numbers, the step of displaying TV channel identification data includes indicating the number of the nearest channel.

If the list of TV channels is arranged in alphabetical order of channel or program names, the step of displaying includes indicating the first letter in the name of the nearest channel.

In accordance with another aspect of the invention the TV system includes a monitor for displaying a list of TV channels, and has a TV channel indicator. In a first mode of operation, the TV channel indicator indicates the number of a selected TV channel when a user directs a pointing device at the selected channel in the list of TV channels. In a second mode of operation, the TV channel indicator indicates the first letter in the name of a selected TV channel when the user directs the pointing device at the selected TV channel in the list of TV channels.

The list of TV channels may be arranged in order of channel numbers in the first mode of operations, and in order of channel names in the second mode of operation.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 3 illustrates contents of a color look-up table.

BEST MODE FOR CARRYING OUT THE INVENTION

The best mode for practicing the invention is based on the realization of a satellite receiver in a digital satellite television system. However, it is to be understood that the present invention is applicable to any system for receiving TV signals.

Figure 1:
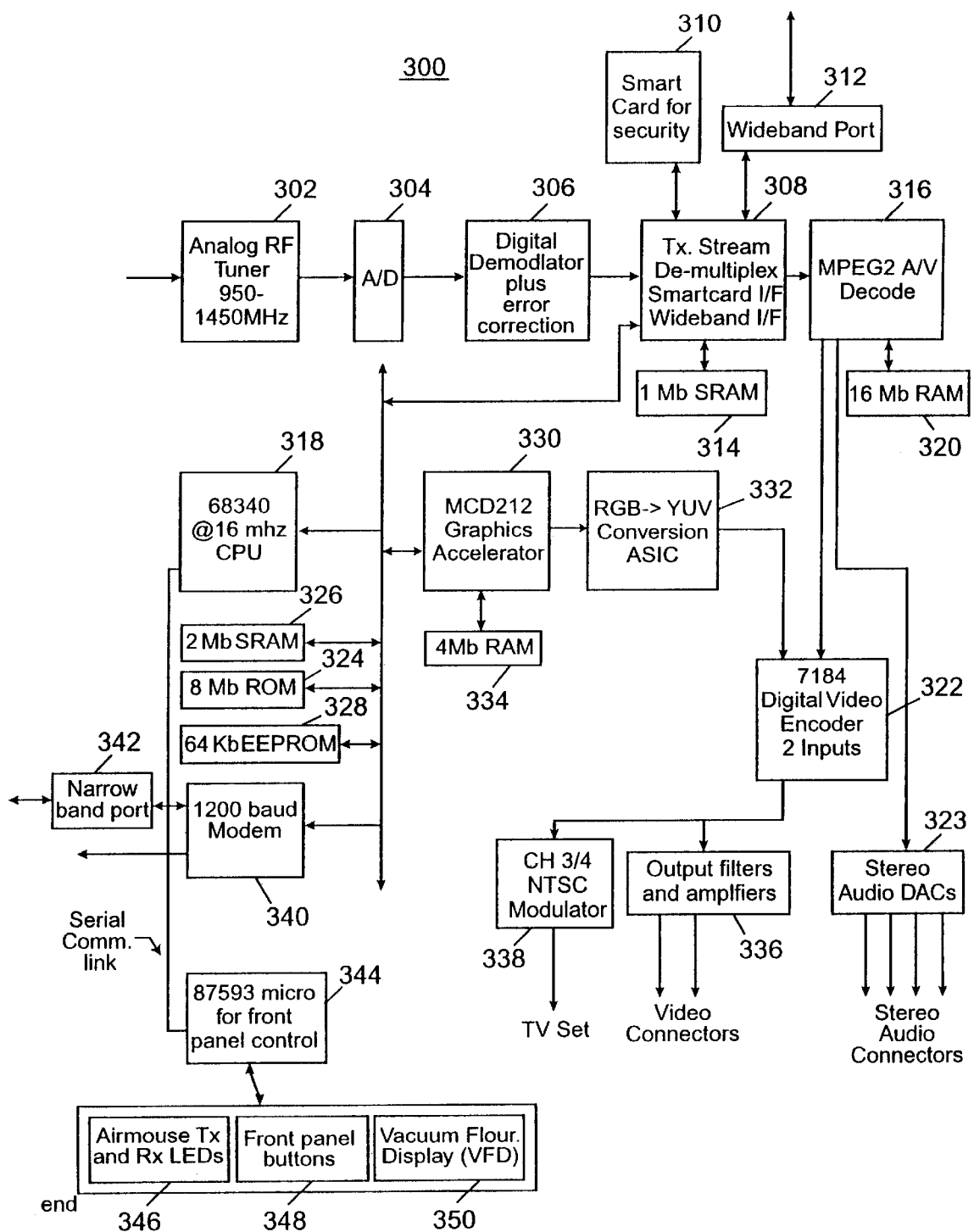
FIG. 1 is a block diagram of a satellite receiver of the present invention.

Reference is now made to FIG. 1 of the drawings wherein an indoor satellite receiver 300 includes an analog radio-frequency (RF) tuner 302 such as a satellite front end demodulator manufactured by Sharp/Comstream. The RF tuner 302 is coupled via an external UHF/VHF to an outdoor unit that receives incoming television signals from a satellite. The outdoor unit may comprise a 18" antenna made of aluminum and dual low noise block converters that convert satellite signals in a frequency range from 12.2–12.7 GHz received by the antenna into the 950–1450 Mhz frequency range signals.

The RF tuner 302 equipped with a local oscillator and mixer selects the appropriate carrier signal corresponding to a selected satellite TV channel from the 950–1450 Mhz signals received from the outdoor unit. The frequency of the selected carrier is converted to an intermediate frequency (IF) signal fed to an analog-digital converter 304 that produces a digital IF signal.

A digital demodulator 306 performs QPSK demodulation of the digital IF signal and carries out multiple error correction algorithms required to decode error correction data contained in the received signal. For example, Viterbi and Reed-Solomon error correction algorithms may be employed. A single ASIC manufactured by Comstream may be used as the digital demodulator 306.

The decoded digital signal is fed to a transport chip 308 responsible for demultiplexing video, audio and data signals. The transport unit 308 is also connected to a card 310 for providing conditional access to the satellite receiver 300. The card 310, such as a Smart Card manufactured by the News Data Corporation, controls access to paid channels and services using the Data Encryption Standard (DES).

Wideband data are fed to the transport unit 308 via a wideband port 312 that provides compatibility with 16:9 wide NTSC format. The wideband port is also controlled by the conditional access system. A buffer 314 is used to support the transport chip operations. A 128K×8 static random-access memory (SRAM) with access speed of 70 ns may be used as the buffer 314.

The transport chip 308 routes the video and audio signals to an MPEG decoder 316, while data is made available to a CPU 318. The MPEG decoder 316 provides decompression of the video and audio signals in accordance with the MPEG standard. For example, a single-chip STi3520 MPEG decoder may be used. By way of example, reference is made to U.S. Pat. No. 5,198,901 to Lynch of Mar. 30, 1993; to U.S. Pat. No. 5,293,229 to Iu of Mar. 8, 1994; to U.S. Pat. No. 5,311,310 to Jozawa et al. of May 10, 1994; to U.S. Pat. No. 5,361,105 to Iu of Nov. 1, 1994; to U.S. Pat. No. 5,386,234 to Veltman et al. of Jan. 31, 1995; and to U.S. Pat. No. 5,400,076 to Iwamura of Mar, 21, 1995. Those disclosures and citations referenced therein may be consulted for an understanding of the specific details of conventional MPEG decompression arrangements.

The MPEG decoder 316 of the preferred embodiment is supported by a synchronous RAM 320 formed by four 256K×16 DRAMs with access speed of 70 ns capable of holding 3 full frames of MPEG video and audio data, and control information.

Decompressed video data in YUV format is fed to a digital video encoder 322. The decompressed audio data is supplied to the video encoder 322, and to a stereo audio digital-to-analog converter (DAC) 323 for converting digital audio signals into analog form. A single-chip AK4319 DAC, manufactured by Asahi Kasei, may be used as the DAC 323.

Operations of the satellite receiver 300 are supported by the CPU 318 such as a Motorola 68340 CPU chip running at 16 MHz. An external watch crystal is used to derive the 16 MHz internal clock. The CPU 318 may have a 16-bit external data bus and a 32-bit data bus for internal operations. The CPU 318 may run the PSOS+ operating system developed by Integrated Systems Inc.

The CPU 318 is supported by a ROM 324, a SRAM 326 and an EEPROM 328. The ROM 324 that holds the PSOS+ operating system, menus, fonts, and other fixed data may be formed by two 4Mbit masked ROM chips organized as 512K×8 with access speed of 95 ns.

The SRAM 326 formed, for example, by two 1Mbit SRAM chips organized as 128K×8 with access speed of 70 ns, may be used for storing all active data such as system stacks, variables, menu data, etc. The ROM 324 and SRAM 326 may operate at a zero wait state to provide maximum performance.

The EEPROM 328, for example, a single 8K×8 EEPROM chip with access speed of 150 ns, may store non-volatile data such as user preferences.

To enhance the graphics presentation capabilities of the satellite receiver 300, a graphics accelerator 330, such as a MCD212 graphics accelerator manufactured by Motorola, is used as a co-processor. The graphics accelerator 330 allows the receiver 300 to increase the rate of screen updates and to provide up to 256 colors in a graphics image. Also, the accelerator provides graphical effects such as wipes, dissolves, fades, etc. during transitions of menus on a TV screen, and supports operations of a remote pointing device such as an Airmouse®. This type of remote pointing device is manufactured by Seletech and Airmouse Remote Controls. The output of the graphics accelerator 330 produced in RGB format is fed to a converting circuit 332 for conversion into YUV format.

The graphics accelerator 330 may be supported by a synchronous 4Mbit RAM 334 provided, for example, on a single 256K×16 DRAM chip with access speed of 70 ns. The RAM 334 used for storing graphics data is capable of storing two graphics planes with 720×480 pixel resolution. The graphics accelerator 330 allows two graphics planes to be combined to produce various graphical effects.

The graphics data from the conversion circuit 332, and decompressed video and audio data from the MPEG decoder 316, are supplied to separate inputs of the digital video encoder 322 such as a single-chip Phillips 7184 encoder. The video encoder 322 is responsible for encoding digital video, audio and graphics data to produce a combined composite signal in NTSC format. For example, U.S. Pat. No. 5,489, 947 to Cooper of Feb. 6, 1996, incorporated herewith by reference, discloses an on-screen display (OSD) arrangement that allows the graphics data to be displayed on a TV set screen together with the image represented by the received video signals, or in place of this image. A single control bit may be used by the video encoder 322 to switch its output from graphics data to video and back.

The video encoder 322 also produces baseband video and audio signals. The baseband video signals are buffered by a pair of video operational amplifiers 336 coupled to video connectors. The baseband audio signals are fed to the stereo audio DAC 323 for converting to analog format and supplying to audio connectors. The video and audio connectors may be coupled to such external devices as stereo receivers, TVs or VCRs.

The combined composite signal from the video encoder 322 may be fed to a NTSC modulator 338 that modulates the composite signal to either channel 3 or 4 of a TV set coupled to the modulator 338. The modulator 338 also allows the combined composite signal to bypass a cable/antenna input of the TV set. Operations carried out to display video and graphical images on the TV set screen will be described in more detail later.

The TV set coupled to the satellite receiver 300 may display graphics data representing a graphical user interface (GUI) that allows a user to control operations of the satellite receiver 300, and provides user access to services and options offered by the digital satellite TV system. For example, graphics on the TV set screen may represent a graphical channel changer that enables a user to select TV channels. Another example of a graphical presentation on the TV screen is an electronic program guide that contains names of TV programs arranged in a 2-dimensional array, in which TV channels are listed vertically, and the time of broadcasting is listed in the horizontal direction. Various aspects of the GUI including the graphical channel changer and the electronic program guide are discussed in more detail later.

A modem 340, such as a single-chip SSI 1200-baud modem, is provided to support communications via a narrowband port 342 used for low bandwidth signal transmission, or via a telephone jack connected to a telephone line. For example, the modem 340 may support remote billing and interactive services.

A microcontroller 344 such as a Phillips 87593 microcontroller provides control of receiver functions relating to control, interface and display devices arranged at the front panel of the satellite receiver 300. Among such devices are a pointing device interface 346, front panel controls 348, and a vacuum fluorescent display (VFD) 350.

The pointing device interface 346 enables a remote optical pointing device such as an Airmouse® to provide a wireless control of the satellite receiver 300. By way of example, reference is made to U.S. Pat. No. 5,045,843 to Hansen of Sep. 3, 1991, and U.S. Pat. No. 5,359,348 to Pilcher et al. of Oct. 25, 1994 for descriptions of Airmouse® arrangements and operation. For example, the pointing device interface 346 may comprise an infrared (IR) transmitter and receiver that provide infrared communications with a pointing device located up to 7 meters away from the receiver 300 at an angle of up to 45 degrees. This type of remote pointing device has been used principally for moving the cursor of a personal computer.

The Airmouse® type pointing device in accordance with the invention points directly at a TV set screen to provide direct interactions between the user hand that holds the pointing device, and the TV screen. The pointing device may comprise a cursor control circuit that moves a cursor on the TV screen in response to the position of the pointing device with respect to, for example, the IR transmitter at the front panel of the receiver. The pointing device interface 346 supports the GUI by providing and controlling the RF tuner 302 of the satellite receiver to respond to random, instant user access to any point on the TV screen. Selections are made by clicking one of the buttons on the pointing device. For example, at any time when there are no graphics on the screen, a click brings up graphical objects used in a channel changer mode. Interactions between the GUI and remote pointing device are disclosed in more detail in our copending application SN, entitled "TELEVISION GRAPHICAL USER INTERFACE EMPLOYING REMOTE RANDOM ACCESS POINTING DEVICE," filed concurrently herewith and incorporated by reference.

In addition to the optical pointing device, a remote hand held control unit of the satellite receiver 300 may also include several dedicated buttons to provide, for example, switching power ON and OFF, channel and volume control, selection between regular TV broadcasting and satellite broadcasting, etc.

The front panel control 348 provides control of the GUI in the event that the remote pointing device is missing or non-operable. The controls 348 may include a TV/Satellite receiver key for switching between regular TV broadcasting and satellite broadcasting. Set-up, menu, clear, select or "click" keys may be provided to control modes of operation. Cursor keys may be arranged to move the cursor on the TV screen in various directions.

The VFD 350 is provided to show current TV channel number and time. Also, the VFD 350 may indicate current incoming signal strength and other operational information.

Figure 2:
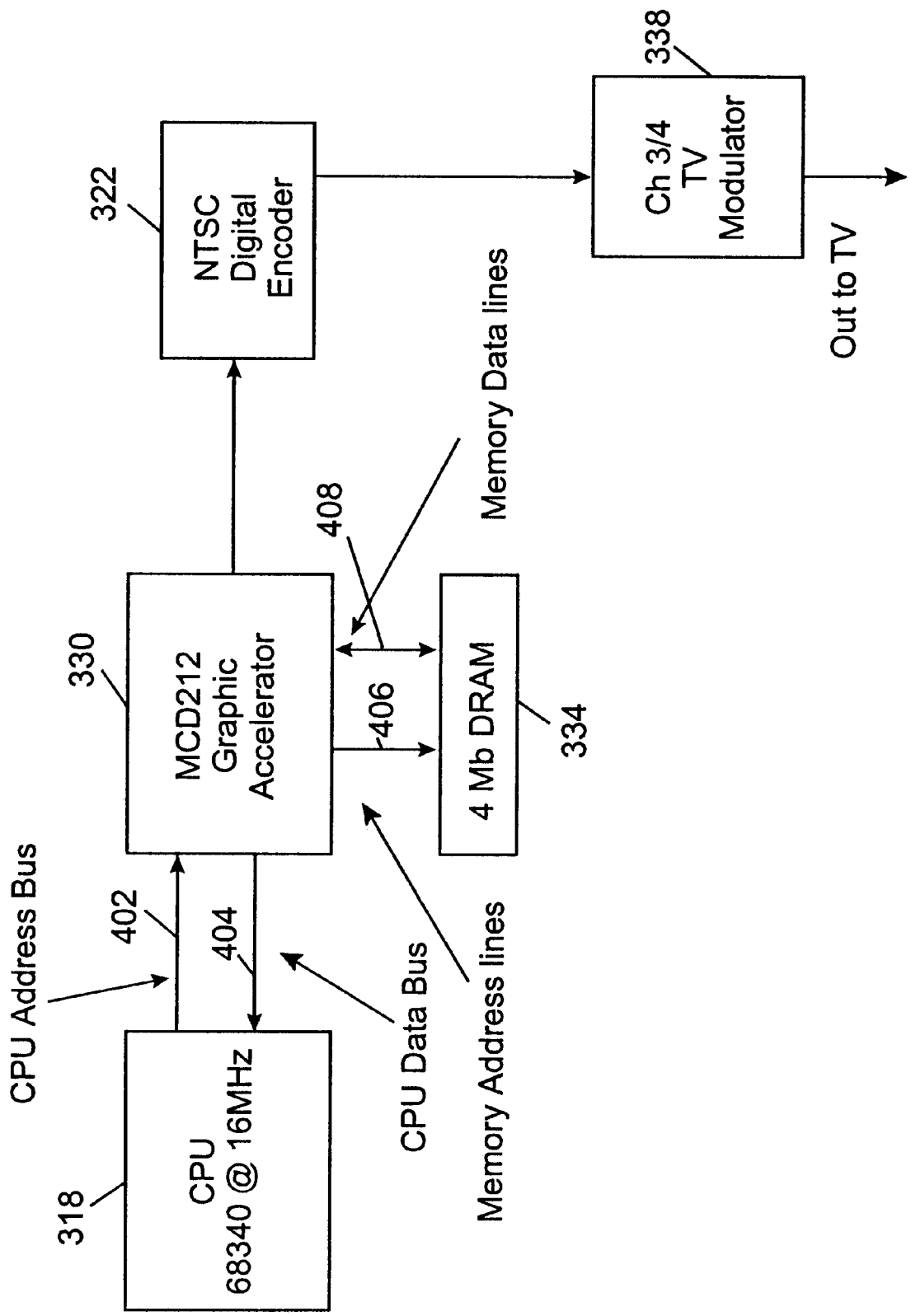
FIG. 2 is a block diagram illustrating a graphical object drawing procedure.

Reference is now made to FIG. 2 that illustrates drawing color graphic objects on a TV screen according to the present invention. As discussed above, the CPU 318 interacts with the graphics accelerator 330 used as a co-processor to enhance the graphics capability of the satellite receiver 300. The CPU 318 may be coupled to the graphics accelerator 330 via an external 24-bit address bus 402 and a 16-bit data bus 404. The 24-bit address bus 402 enables the CPU 318 to address up to 16Mbytes of a graphics memory. This storage capacity corresponds to an address space from 000000 to ffffff in hexadecimal notation. Various graphics memory arrangements may be organized in this address space, as long as each memory location is uniquely addressable. For example, the capacity of the graphics memory 334 may be equal to 4Mbit or 512Kbytes. Assuming that the graphics memory address space corresponds to the middle part of the system memory map, the $800000 hex address may be selected as the lowest graphics memory location, and the $87ffff hex address may be designated as the top graphics memory address. The graphics memory 334 may be coupled to the graphics accelerator 330 via memory address lines 406 and memory data lines 408.

The graphics accelerator 330 enables a TV set to display up to 16 million different colors. However, only 256 different colors can be displayed on any one screen at any given time. As a result, each unique pixel displayable on a TV screen can be represented by a single 8-bit value. Thus, each pixel stored in the 512Kbyte graphics memory 334 is represented by a single 8-bit value or byte.

Each graphics plane stored in the graphics memory 334 is provided by a rectangular array of 720×480 pixels representing a picture on the TV screen. For example, the pixels may be stored in the graphics memory 334 from top left to bottom right in row order. Thus, the top left hand pixel of the screen resides at the $800000 hex graphics memory location. The second pixel on the top line 1 is stored at $800001 hex, etc. The last pixel of the top line 1 is held at $8002D0 hex. The first pixel of the next line 2 is at the $8002D1 hex graphics memory location, etc. The bottom right hand corner of the screen corresponds to the $8545ff location of the graphics memory 334. Thus, the graphics memory arrangement corresponds to a rectangular X,Y-coordinate system on the TV screen, where 720 pixels in each line of the array are arranged in the horizontal direction X, and 480 pixels in each row of the array are arranged in the vertical direction Y.

The graphics accelerator 330 contains a color look up table (CLUT) that converts 256 elements representing 8-bit pixel values stored in the graphics memory 334 into 24-bit values composed of red (R), green (G), and blue (B) bytes corresponding to R, G, and B components of a picture in RGB format. The CLUT may be programmed by the CPU 318 to reproduce any color possible in a 24-bit color space.

FIG. 3 illustrates some typical colors reproducible by the CLUT. For example, black color composed of red, green and blue bytes represented by $0 hex may correspond to the $0 hex location of the CLUT. White color composed of the $ff hex red, green and blue bytes may correspond to the $4 hex CLUT location, etc.

When the CLUT is programmed, the CPU 318 accesses the graphics memory 334 to write data values representing graphics. The graphics accelerator 330 scans the graphics memory 334 at a rate of 13.5 MHz to read the graphics data. Each 8-bit pixel value is transferred to the CLUT that converts it into a 24-bit color value in RGB format. As discussed above, the converter 332 converts the RGB color value into YUV format, and passes a 24-bit digital YUV value to the digital encoder 322 that converts it into analog NTSC luminance and chrominance signals, for example, at a 13.5 MHz rate. The NTSC encoding procedure carried out by the encoder 322 is well known to those skilled in the art. The analog luminance and chrominance signals via the TV modulator 338 are supplied to the TV set.

Figure 4:
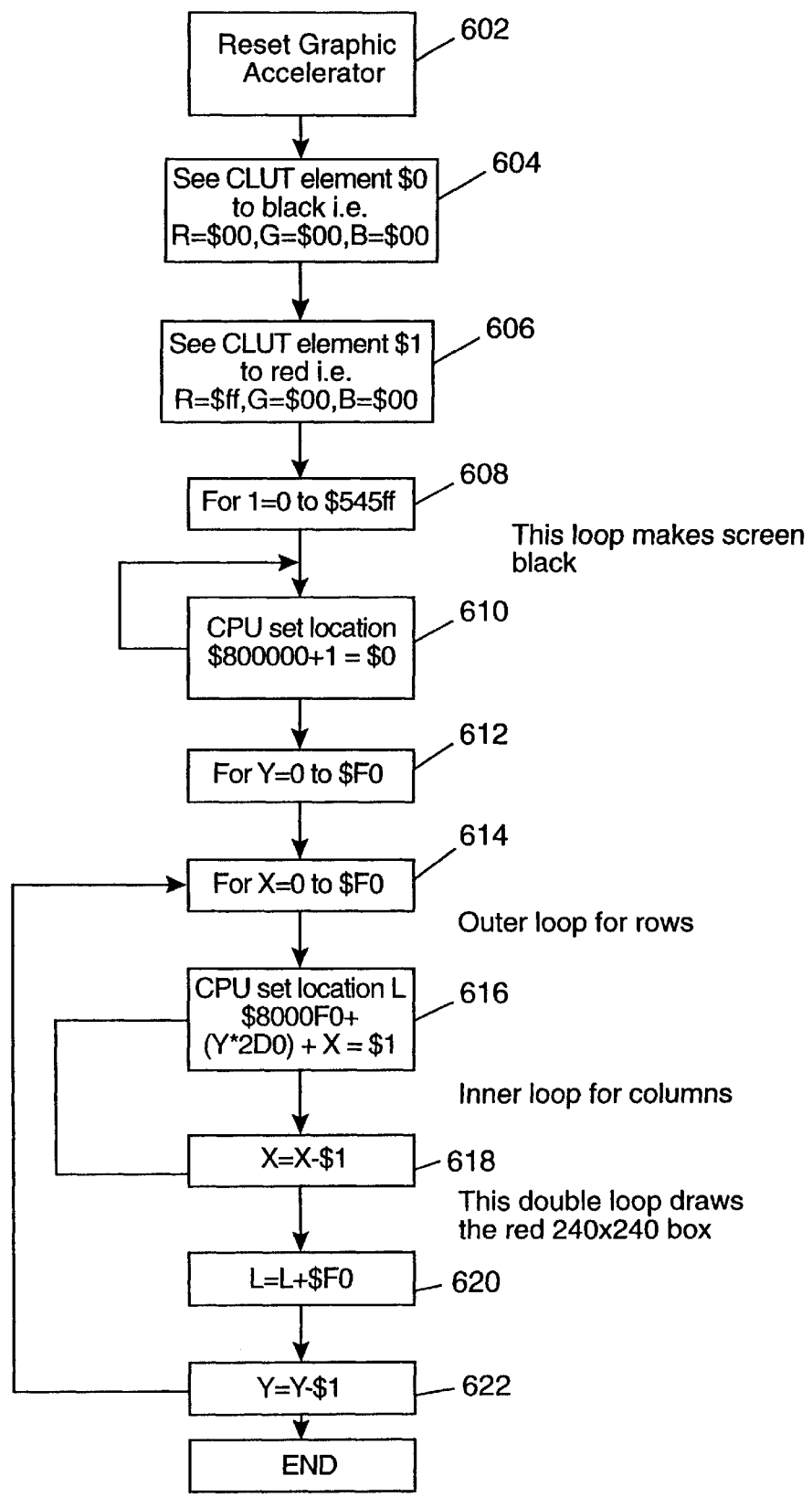
FIG. 4 is a flow chart illustrating an example of interactions between a CPU and graphics accelerator.

FIG. 4 shows a flow chart that illustrates an example of interactions between the CPU 318 and graphics accelerator 330 to draw a 240×240 pixel red square in the middle of a TV screen with a black background. In step 602, the CPU 318 resets the graphic accelerator 330. In step 604, the CPU 318 programs the CLUT in the graphics accelerator 330 so as to set CLUT location $0 hex to reproduce black color, i.e. red, green and blue bytes in this location are set to $0 hex. In step 606, the CPU 318 sets CLUT location $1 hex to reproduce red color, i.e. a red byte in this location is set to $ff hex, and green and blue bytes are set to $0 hex.

In steps 608 and 610, the CPU 318 carries out a loop to make the TV screen black. Locations $800000+I of the graphics memory 334 are set to $0 hex, for I that varies from $0 hex to $545ff hex.

In steps 612–622, the CPU 318 performs a double loop to draw the red 240×240 pixel box on the screen. The double loop comprises an outer loop carried out to set pixels in rows (Y-direction on the screen) of the graphics memory 334 to $1 hex to reproduce them in red color, and an inner loop to set pixels in lines (X-direction) of the graphics memory 334 to $1 hex to reproduce them in red color.

Figure 5:
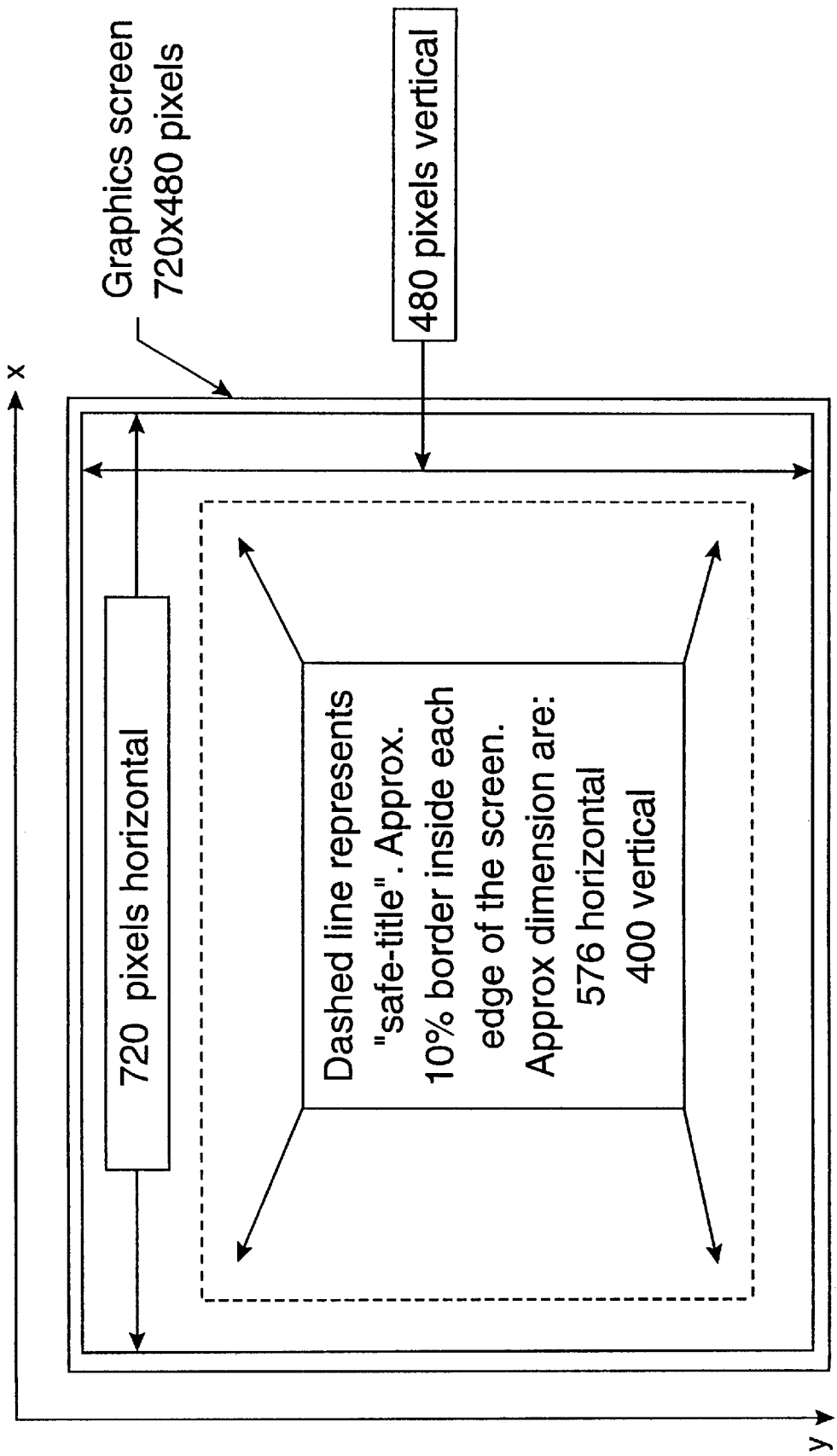
FIG. 5 is a diagram illustrating arrangement of pixels on a TV screen.

Graphical objects displayed on the TV screen are represented by a 2-dimensional array of pixels. For example, as shown in FIG. 5, the TV screen may be represented by a 720×480 array of pixels corresponding to a graphics plane stored in the graphics memory 334. 720 pixels may be arranged on the screen in the horizontal direction X, whereas 480 pixels may be arranged in the vertical direction Y. To perform graphics drawing operations, the CPU 318 may use an X, Y-coordinate system shown in FIG. 5, wherein coordinates X=0, Y=0 represent the top left hand corner of the TV screen, and coordinates X=720, Y=480 represent the bottom right hand corner of the screen.

It should be noted that due to "overscan" conditions, a television receiver may produce a raster on its screen so that pixels in the horizontal and vertical directions may not be entirely in the view of the user. Therefore, TV broadcast systems prevent images from being displayed outside of a "safe title" area located within approximately a 10% border all around the edge of the screen. As shown in FIG. 5, the safe title area contains approximately 576 pixels in the horizontal direction, and 400 pixels in the vertical direction. With such a scheme, the top left hand corner of the safe title area is located at position X=72, Y=40. The bottom right hand corner of the safe title area has coordinates X=648, Y=440. On the discussed below diagrams that illustrate the functional modes of the GUI, an outer solid-lined box represents the edge of the TV screen, and a dash line shows the border of the safe title area. The graphical objects displayed in various GUI modes are drawn in accordance with the graphical object drawing procedure discussed above in connection with FIGS. 2–4.

Figure 6:
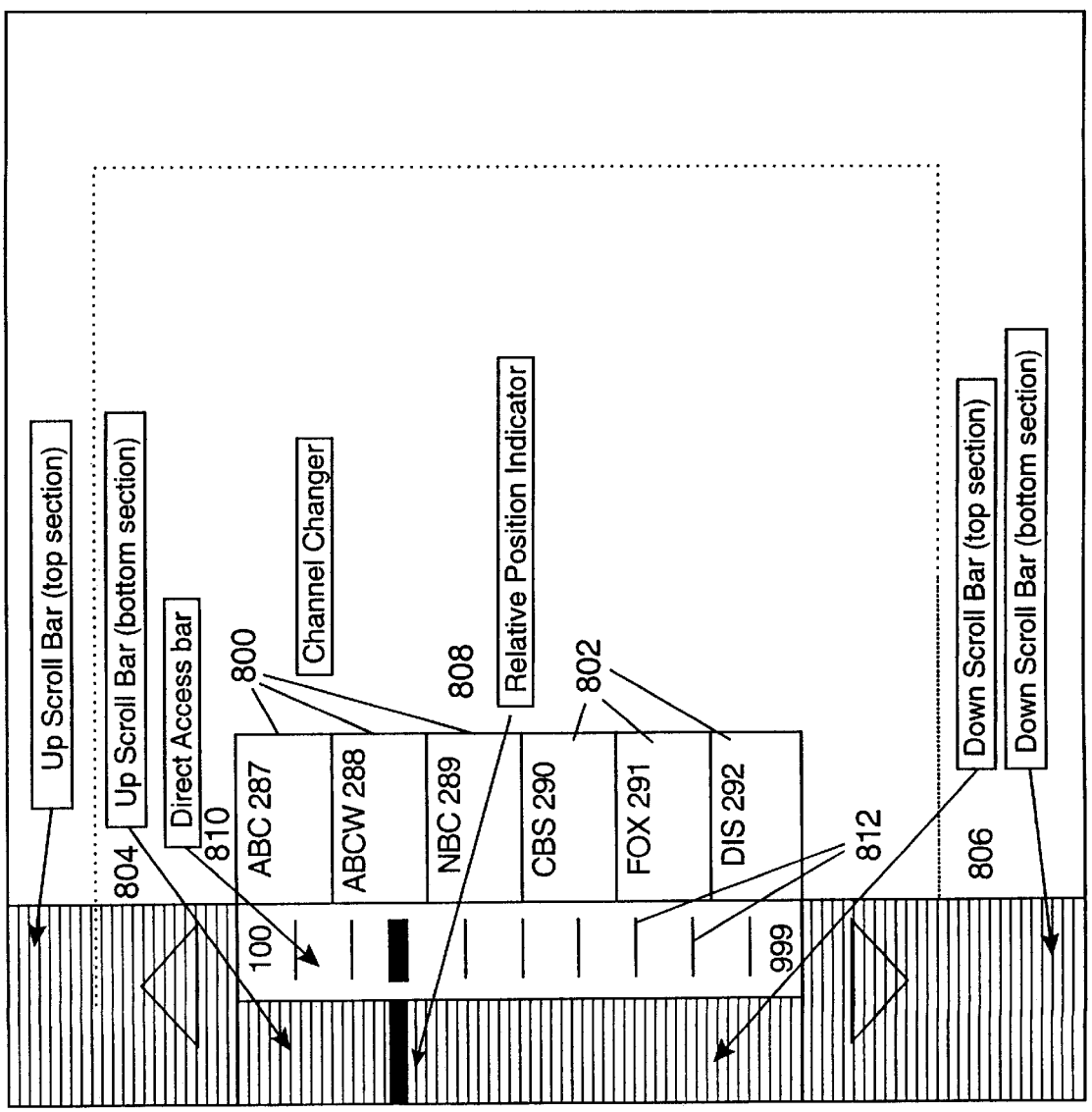
FIG. 6 is a diagram illustrating the TV GUI in a channel changer mode when TV channels are arranged in order of their numbers.

Referring to FIG. 6, when the TV GUI of the present invention is placed in a channel changer mode that enables users to select TV channels, a TV set coupled to the satellite receiver 300 displays a graphical channel changer 800 having a vertical channel bar that includes graphical channel boxes 802 representing TV channels available in the satellite receiver 300. For example, each box 802 may contain the channel number and logo of a TV channel. In a digital satellite TV system, the channel bar may represent about 1,000 TV channels. A restricted number of the boxes 802 may be displayed on the TV screen at any given time. For example, FIG. 6 shows that six boxes 802 representing channels 287–292 are simultaneously displayed. The vertical channel bar may be represented by 120×300 pixels. For example, its top left corner may have coordinates X=122, Y=90, and its bottom right corner may be arranged at X=242, Y=390.

To switch the TV set to a required TV channel, the user directs the pointing device at the graphical channel box 802 that contains the number and logo of the required channel. The movement of the pointing device held in the user's hand causes the cursor to move to the required graphical channel box 802. The coordinates of the pointing device may be supplied to the microcontroller 344 on a periodic basis, for example, 60 times a second. The CPU 318 generates X, Y coordinates corresponding to a path for moving the cursor in alignment with the pointing device movement. Cursor movement is achieved by multiple erasures and redraws of the cursor image performed on the path to the selected position. When the required channel box 802 is reached, the user may press a select button on the pointing device to tune to the TV channel represented by the channel box 802. In response to the user command, the CPU 318 sends a tune command to the RF tuner 302 to tune the satellite receiver 300 to the required TV channel.

Up and down scroll bars 804 and 806 may be arranged near the channel bar to allow a user to move up and down through the entire list of TV channels. For example, the scroll bars 804 and 806 shown in FIG. 6 represent channels 100 through 999. A single click of the pointing device button causes the channel changer 800 to move up or down by one channel with respect to the TV channels currently represented in the channel boxes 802. For example, when the user clicks the pointing device held in the direction of the up scroll bar 804, the boxes 802 will shift from channels 287–292 to channels 286–291. If the pointing device points at the down scroll bar 806, a single click will cause the boxes 802 to move from channels 287–292 to channels 288–293. Holding down the pointing device button may cause the list of TV channels to scroll continuously. A relative position indicator 808 shows the position of the TV channels currently displayed in the channel boxes with respect to other TV channels. Operations of the scroll bars are disclosed in more detail in our copending application SN, entitled "TELEVISION GRAPHICAL USER INTERFACE HAVING VARIABLE CHANNEL CHANGER ICONS," filed concurrently herewith and incorporated by reference.

It may be difficult to find a required channel among 1,000 channels provided by satellite TV, when the user does not know the number of the required channel. A direct access channel bar 812 presented next to the channel bar has a graduated scale representing available TV channels. The numbers of the first and last channels are respectively placed on the top and bottom of the scale. For example, the channel bar 810 has numbers 100 and 999 on its top and bottom indicating that TV channels 100 through 999 are represented. Multiple tick marks 812 are provided in the channel bar 810 to indicate positions of TV channels arranged between the first and the last channel. For example, the channel bar 810 in FIG. 6 has nine tick marks 812.

The direct access bar 810 may be drawn in accordance with the graphical object drawing procedure discussed above. For example, it may be represented by a 50×300 pixel array. The direct access bar 810 may have its top left corner provided at X=72, Y=90, and its bottom right corner arranged at X=122, Y=390.

When a user points the pointing device at a selected region of the channel bar 810 and clicks, the channel boxes 802 display numbers and logos of TV channels represented by that selected region. For example, when the user clicks on the region representing channel 200, one of the channel boxes 802 will display the number and logo of channel 200, and the other channel boxes 802 will show numbers and logos of TV channels immediately before and/or after channel 200. Operations of the direct access channel bar 810 are disclosed in more detail in our copending application SN, entitled "TELEVISION GRAPHICAL USER INTERFACE HAVING CHANNEL CONTROL BARS," filed concurrently herewith and incorporated by reference.

The tick marks provided on the direct access bar 810 allow the user to approximately determine the numbers of TV channels arranged in various regions of the bar. However, if the channel changer 800 is required to be switched to a particular TV channel, it may be difficult to distinguish the required TV channel using the direct access bar 810.

For example, the direct access bar 810 that represents about 1000 TV channels may be provided by 300 pixels arranged in the vertical direction. When nine tick marks 812 are used, a region between adjacent tick marks represents about 100 TV channels. Accordingly, if, for example, TV channel 287 is required to be displayed in one of the channel boxes 802, the pointing device should be directed at the region of the direct access bar 810 between the second and the third tick marks that respectively indicate TV channel 200 and TV channel 300. In response to a click on this region, a group of six consecutive TV channels between channels 200 and 300 will be displayed in the channel boxes 802.

However, each pixel on the channel bar 810 may correspond to more than three TV channels. Accordingly, the distance between regions on the channel bar 810 corresponding to adjacent TV channels is so small that it is difficult to direct the pointing device accurately enough to include the required TV channel 287 in the channel group displayed in the channel boxes 802.

An absolute cursor position indicator 814 is arranged in the middle of the direct access channel bar 810 to indicate to the user the numbers of TV channels represented by various points on the channel bar 810, when the user moves the pointing device over these points. Alternatively, as explained in more detail later, when TV channels in the TV changer 810 are arranged in order of channel or program names, the absolute cursor position indicator 814 indicates the first letter in the name of a TV channel or program represented by a point on the direct access bar 810, at which the pointing device is directed. Once the user clicks the pointing device when the absolute cursor position indicator 814 indicates the number of a required TV channel or the first letter of a channel or program name, the channel changer 800 switches to display the number and logo of the required channel in one of the channel boxes 802.

Figure 7:
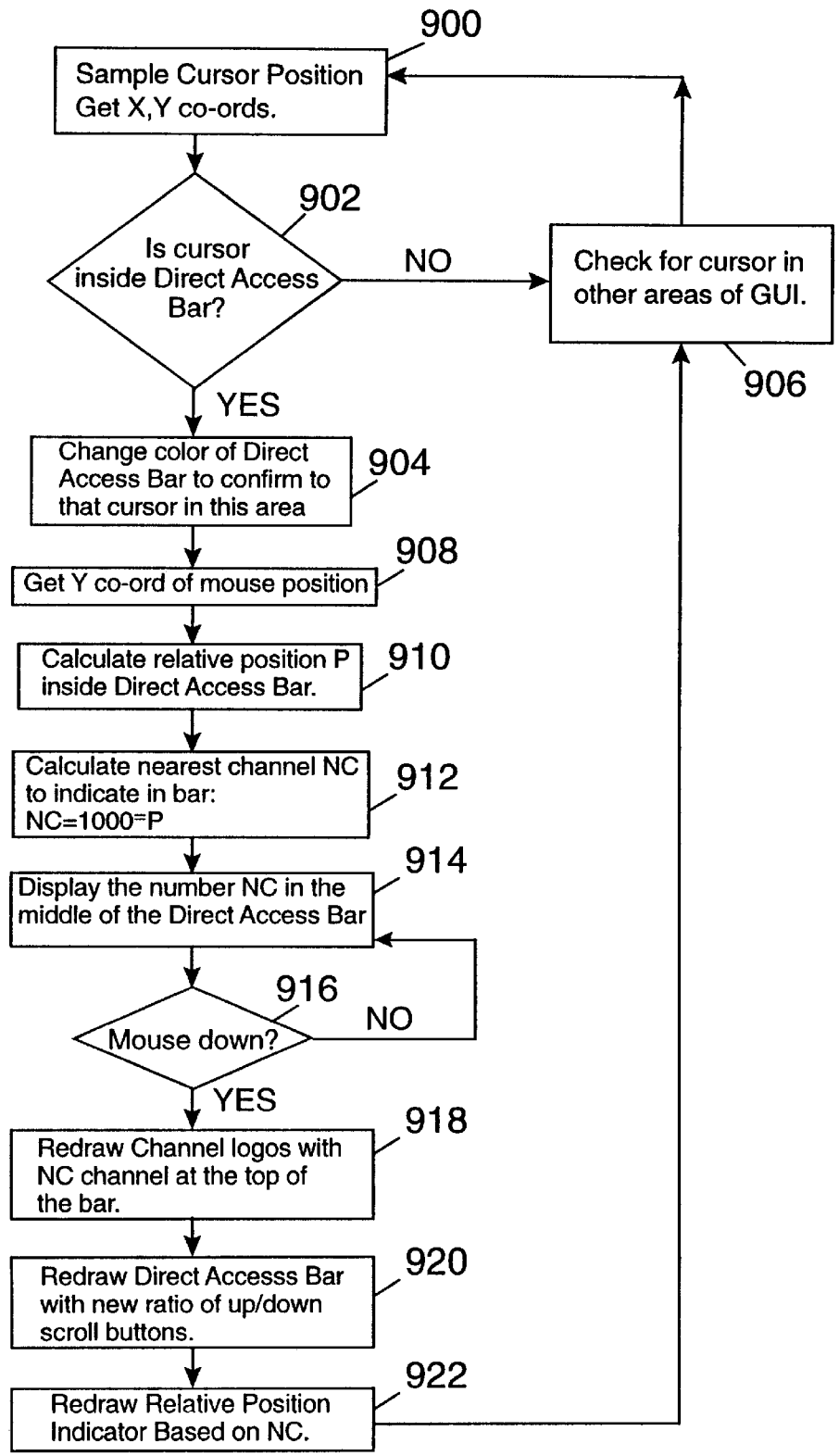
FIG. 7 is a flow-chart illustrating direct access operations using an absolute cursor position indicator that indicates channel numbers.

Reference is now made to FIG. 7 that shows a flow chart illustrating direct access operations using the absolute cursor indicator 814 for displaying the numbers of TV channels nearest to the cursor position. In step 900, the pointing device held in the user's hand causes the cursor to move to a selected area of the direct access bar 810. Coordinates of the pointing device may be supplied to the microcontroller 344 on a periodic basis, for example, 60 times a second. In response, the CPU 318 samples the cursor positions to generate X, Y coordinates corresponding to a path for moving the cursor in alignment with the pointing device movement. Cursor movement is achieved by multiple erasures and redraws of the cursor image performed on the path to the selected area. In step 902, the CPU 318 determines whether or not the cursor is inside the direct access bar 810. If so, the color of the direct access bar 810 changes to indicate that the cursor is inside the bar (step 904). If not, the CPU checks for cursor in the other areas of the GUI (step 906) and returns to sampling the cursor positions in step 900.

After it is confirmed that the cursor is over the direct access bar 810, the CPU 318 obtains the Y-coordinate of the cursor position (step 908). Based on this coordinate, the CPU 318 determines a relative cursor position P that indicates the position of the cursor with respect to the position of the direct access bar 810 (step 910). The relative position P is calculated as follows:

$$P=(Y-Y_{min})/Y_D,$$

where Y is the Y-coordinate of cursor, $Y_{min}$ is the Y-coordinate of the top edge of the direct access bar channel 810 (equal to 90 in the example illustrated in FIG. 6), $Y_D$ is the total number of pixels in the vertical direction represented the direct access bar 810 (equal to 300 in the example illustrated in FIG. 6).

In step 912, the CPU 318 calculates the number NC of the TV channel nearest to the current cursor position as follows:

$$NC=N_T*P,$$

where $N_T$ is the total number of TV channels represented by the direct access channel bar 810 (for example equal to 1000).

The calculated number NC is displayed in the absolute cursor position indicator 814 in the middle of the direct access bar 810 (step 914). In step 916, the CPU 318 checks whether or not the select button on the pointing device is pressed. If not, the system returns to step 900.

If the select button is pressed, the channel boxes 802 are redrawn to display the number and logo of channel NC, for example, in the top channel box 802 (step 918). The numbers and logos of TV channels immediately after channel NC are displayed in other channel boxes 802.

In step 920, the up and down scroll bars 804 and 806 are redrawn to change their sizes according to the calculated position of channel NC relative to the other channels represented by the direct access bar 810. In step 922, the relative position indicator 808 is redrawn based on the NC value. Then, the system returns to monitoring a cursor position in step 900.

The above-discussed procedure relates to the channel changer 800 that contains TV channels arranged in order of their numbers. However, the present invention allows TV channels in the channel changer to be arranged in alphabetical order of their names or names of programs carried by TV channels.

Figure 8:
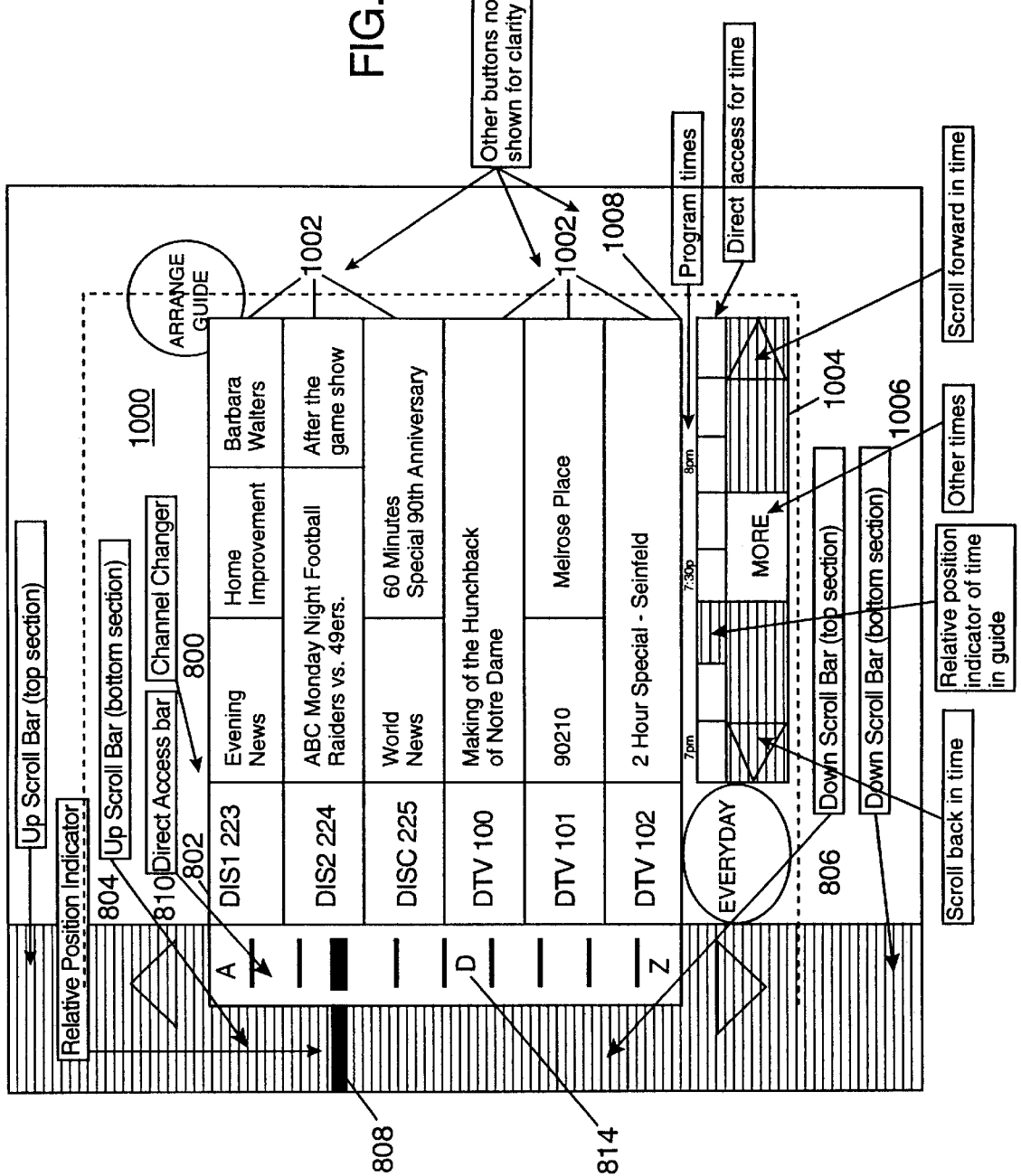
FIG. 8 is a diagram illustrating the TV GUI in a program guide mode when TV channels are arranged in alphabetical order of their names.

Reference is now made to FIG. 8 that illustrates the GUI of the present invention in a program guide mode wherein the channel changer 800 displays TV channels arranged in alphabetical order of their names. The program guide mode enables users to view TV programming information for various TV channels. In this mode, the TV GUI of the present invention displays an electronic program guide 1000 based on the graphical channel changer 800. This arrangement allows users to review TV programming information, and then, to select a TV channel that carries a desired TV program by directing the remote pointing device at the channel box 802 for the selected TV channel.

In addition to the channel changer 800, the program guide 1000 comprises horizontal program bars 1002 that indicate TV programs carried by TV channels during a predetermined time period. For example, ninety minutes of programming may be shown. Each horizontal program bar 1002 is aligned with the channel box 802 representing the TV channel that carries the TV programs indicated in that program bar 1002. Below the horizontal bars 1002 are time legends that indicate the time of the TV programs represented by the horizontal bars 1002. For example, the electronic program guide 1000 shown in FIG. 8 contains TV programming from 7 p.m. to 8.30 pm.

A horizontal time scroll bar 1004 may be arranged below the time legends to enable the user to look at a TV program schedule before and after the time indicated by the time legends. A graphical button MORE 1006 allows the user to select any time period for which a TV program schedule is required. A direct access time bar 1008 similar to the direct access channel bar 810 enables the user to access a TV program schedule for a selected region of the time bar 1008 by directing the pointing device at the selected region.

Further, the TV GUI operating in the program guide mode may maintain the up and down channel scroll bars 804 and 806, and the direct access channel bar 810. Thus, the program guide 1000 is formed out of the channel changer 800 when the TV GUI switches from the channel changer mode into the program guide mode. No redrawing of the vertical channel bar is performed. The two-dimensional program/time grid appears instantaneously aligned with the graphics for the channel changer. This allows the user to quickly and seamlessly go from the channel selector mode to the program guide mode, and thereafter, select a TV channel that carries a desired TV program by directing the remote pointing device at the channel box 802 for the selected TV channel. Switching the GUI into the program guide mode is disclosed in more detail in our copending application SN, entitled "TELEVISION GRAPHICAL USER INTERFACE THAT COMBINES ELECTRONIC PROGRAM GUIDE WITH GRAPHICAL CHANNEL CHANGER," filed concurrently herewith and incorporated by reference.

In accordance with the present invention, the GUI has various options for arranging the program guide. For instance, a channel number option enables the user to arrange TV channels in the program guide in order of their numbers, a channel name option allows TV channels in the program guide to be arranged according to their names, and a program name option allows TV programs in the program guide to be sorted in alphabetical order. The options may be selected in an arrange guide mode by clicking the pointing device directed at corresponding option boxes on the screen. The arrange guide mode is disclosed in more detail in our copending application SN, entitled "TELEVISION GRAPHICAL USER INTERFACE HAVING CHANNEL AND PROGRAM SORTING CAPABILITIES" filed concurrently herewith and incorporated by reference.

As discussed above, the channel changer 800 in FIG. 8 contains a list of TV channels arranged in alphabetical order of their names. The channel boxes 802 are arranged so as to display channel logos in alphabetical order from the top to the bottom of the channel changer 800.

The alphabetical order of channel names is reflected in the arrangement of the direct access bar 810 having a graduated scale, in which letters A and Z on the top and bottom of the scale replace channel numbers 100 and 999 displayed in the direct access bar 810 shown in FIG. 6. The letters A and Z imply that TV channels represented by the graduated scale of the direct access bar 810 are arranged in alphabetical order from the top to the bottom of the bar scale. For example, if the user clicks the pointing device directed at the middle of the direct access bar 810, a group of TV channels with names beginning with letters in the middle of the alphabet (for instance, L, M and N) may be displayed in the channel boxes 802.

However, as the direct access bar 810 may represent about 1000 TV channels, it may be difficult to direct the pointing device accurately enough to include a TV channel having a name that begins with a particular letter into the channel group displayed in the channel boxes 802.

The absolute cursor position indicator 814 indicates the first letter in the name of a TV channel represented by a point on the direct access bar 810, at which the pointing device is directed. Thus, once the user clicks the pointing device when the absolute cursor position indicator 814 indicates the first letter in a name of a required TV channel, the channel changer 800 switches to display the number and logo of the required channel in one of the channel boxes 802.

Figure 9:
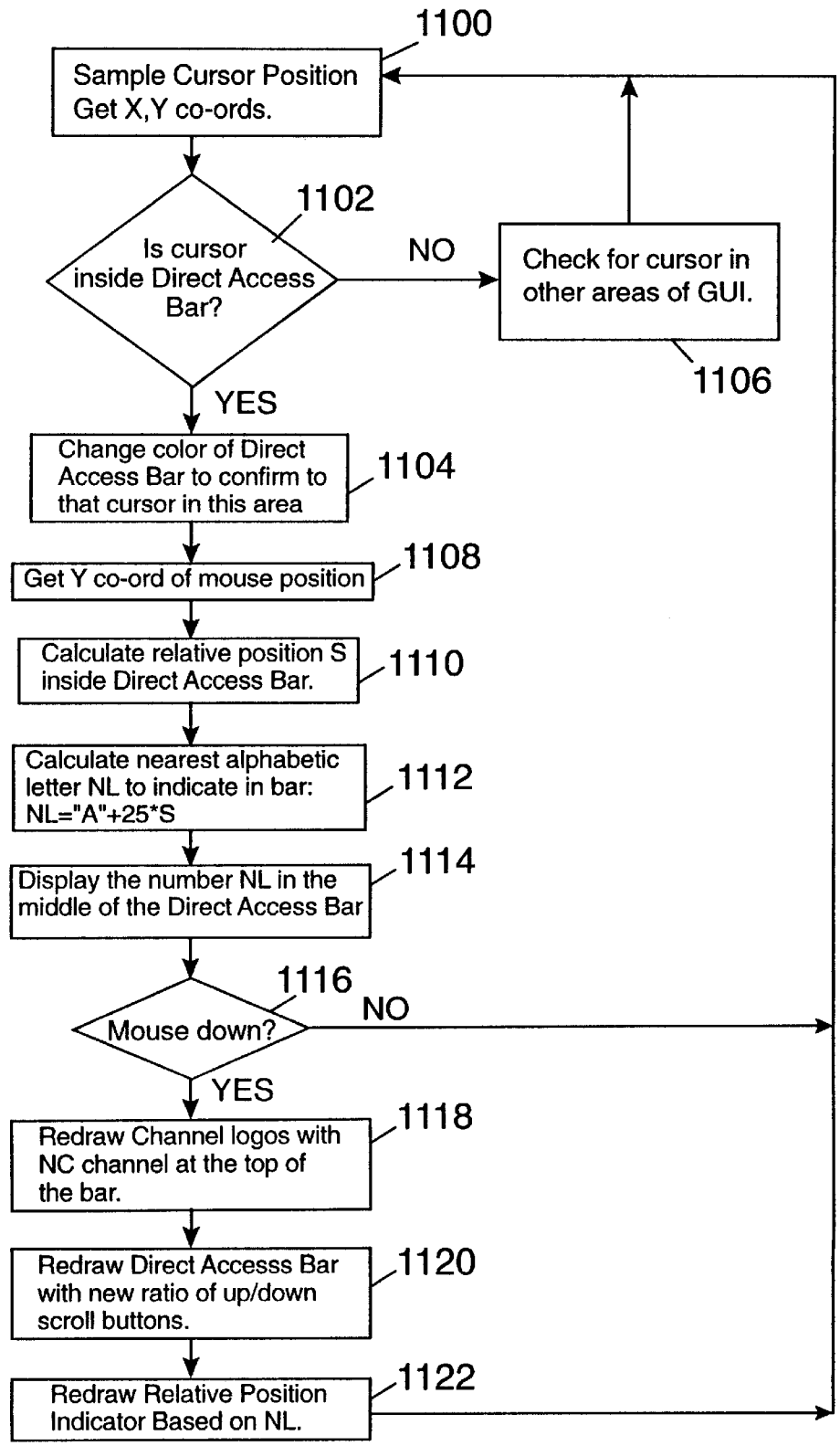
FIG. 9 is a flow-chart illustrating direct access operations using an absolute cursor position indicator that indicates the first letter in channel names.

Reference is now made to FIG. 9 that shows a flow chart illustrating direct access operations using the absolute cursor indicator 814 for displaying first letters in names of TV channels nearest to the cursor position. In step 1100, the pointing device held in the user's hand causes the cursor to move to a selected area of the direct access bar 810. Coordinates of the pointing device may be supplied to the microcontroller 344 on a periodic basis, for example, 60 times a second. In response, the CPU 318 samples the cursor positions to generate X, Y coordinates corresponding to a path for moving the cursor in alignment with the pointing device movement. In step 1102, the CPU 318 determines whether or not the cursor is inside the direct access bar 810. If so, the color of the direct access bar 810 changes to indicate that the cursor is inside the bar (step 1106). If not, the CPU checks for cursor in the other areas of the GUI (step 1106) and returns to sampling the cursor positions in step 1100.

After it is confirmed that the cursor is over the direct access bar 810, the CPU 318 obtains the Y-coordinate of the cursor position (step 1108). Based on this coordinate, the CPU 318 determines a relative cursor position S that indicates the position of the cursor with respect to the position of the direct access bar 810 (step 1110). The relative position S is calculated as follows:

$$S=(Y-Y_{min})/Y_D,$$

where Y is the Y-coordinate of cursor, $Y_{min}$ is the Y-coordinate of the top edge of the direct access bar channel 810 (equal to 90 in the example illustrated in FIG. 8), $Y_D$ is the total number of pixels in the vertical direction represented the direct access bar 810 (equal to 300 in the example illustrated in FIG. 8).

In step 1112, the CPU 318 determines the letter NL nearest to the current cursor position as follows:

$$NL=\text{``A''}+25*S.$$

For example, if the value S is equal to 0, letter "A" will be displayed in the indicator 814. The successive letters in the alphabet are defined by value 25*S.

The determined letter NL is displayed in the absolute cursor position indicator 814 in the middle of the direct access bar 810 (step 1114). In step 1116, the CPU 318 checks whether or not the select button on the pointing device is pressed. If not, the system returns to step 1100.

If the select button is pressed, the channel boxes 802 are redrawn (step 1118). For example, the top channel box 802 may display the number and logo of the channel, which name begins with letter NL. The numbers and logos of TV channels, which names also begin with letter NL or with letters immediately following NL, are displayed in other channel boxes 802.

In step 1120, the up and down scroll bars 804 and 806 are redrawn to change their sizes according to TV channels displayed in the channel boxes 802.

In step 1122, the relative position indicator 808 is redrawn based on the NL value. Then, the system returns to monitoring a cursor position in step 1100.

The above-discussed procedure relates to the channel changer 800 that contains TV channels arranged in alphabetical order of their names. A similar procedure may be performed to support direct access operations when a TV channel list in the channel changer is arranged in alphabetical order of names of programs carried by TV channels.

There accordingly has been described a TV graphical user interface that includes a graphical channel changer for enabling a user to select a required TV channel among about 1000 channels provided by a satellite TV system. The graphical channel changer contains a vertical channel bar composed of channel boxes that display numbers and logos of selected TV channels. To switch the TV set to a required TV channel, the user directs the pointing device at the graphical channel box that indicates the required channel. A direct access channel bar is arranged on a screen so as to cause the channel boxes to display the number and logo of a selected TV channel when the user directs the pointing device at the point on the direct access bar that represents the selected channel. The direct access channel bar is provided with an absolute cursor position indicator that indicates to the user the numbers of TV channels represented by various points on the direct access channel bar, when the user moves the pointing device over these points. When TV channels in the channel changer are arranged in alphabetical order of channel or program names, the absolute cursor position indicator indicates the first letter in the name of a TV channel or program represented by a point on the direct access bar, at which the pointing device is directed.

In this disclosure, there are shown and described only the preferred embodiments of the invention, but it is to be understood that the invention is capable of changes and modifications within the scope of the inventive concept as expressed herein.

What is claimed is:

1. A television (TV) system comprising:
   a CPU, and
   a TV monitor controlled by said CPU for displaying a graphical user interface (GUI) including:
      a channel changer having channel objects for identifying TV channels and enabling a user to tune the TV system to a required TV channel when the user activates a pointing device directed at a channel object identifying the required TV channel,
      a direct access channel bar for indicating a list of TV channels available in the TV system and enabling the user to display in said channel object identification data of a selected TV channel when the user activates the pointing device directed at a region on the direct access channel bar representing the selected TV channel, and
      an absolute cursor position indicator for indicating the selected TV channel when the user directs the pointing device at the region on the direct access channel bar representing the selected TV channel.

2. The system of claim 1, wherein said absolute cursor position indicator indicates the number of the selected TV channel when said list of TV channels is arranged in order of channel numbers.

3. The system of claim 1, wherein said absolute cursor position indicator indicates the first letter in a name of the selected TV channel when said list of TV channels is arranged in alphabetical order of channel names.

4. The system of claim 1, wherein said absolute cursor position indicator indicates the first letter in a name of a program carried by the selected TV channel when said list of TV channels is arranged in alphabetical order of names of programs carried by the TV channels.

5. The system of claim 1, wherein said absolute cursor position indicator is arranged on said direct access channel bar.

6. The system of claim 1, wherein said direct access channel bar comprises a graduated scale representing TV channels.

7. The system of claim 1, wherein said direct access channel bar changes its color when the pointing device is held in the direction of said direct access channel bar.

8. The system of claim 1, wherein said channel objects identify numbers and logos of the TV channels.

9. The system of claim 1, further comprises an RF tuner that switches to a frequency of the required TV channel, when the user directs the pointing device at a channel object identifying the required TV channel.

10. The system of claim 1, wherein said GUI further comprises an electronic TV program guide that contains a schedule of TV programs for a predetermined time period for TV channels defined by said channel objects.

11. The system of claim 10, wherein said electronic TV program guide is aligned with said channel changer.

12. In a graphical user interface displayed on a TV monitor and having channel objects for identifying TV channels, and a direct access object for indicating a list of the TV channels, a method of identifying a selected group of the TV channels comprising the steps of:
   checking a position of a cursor moved by a pointing device,
   detecting when the cursor is positioned over the direct access object,
   determining a coordinate of the cursor,
   calculating a position of the cursor relative to the direct access object,
   determining a nearest TV channel corresponding to the relative position,
   displaying identification data of the nearest TV channel, and
   activating the pointing device to redraw the channel objects so as to identify said selected group including the nearest TV channel.

13. The method of claim 12, wherein said list of TV channels is arranged in order of channel numbers.

14. The method of claim 13, wherein said step of displaying includes indicating number of the nearest channel.

15. The method of claim 14, wherein the pointing device is activated when number of a required TV channel is indicated.

16. The method of claim 12, wherein said list of TV channels is arranged in alphabetical order of channel names.

17. The method of claim 16, wherein said step of displaying includes indicating the first letter in a name of the nearest channel.

18. The method of claim 17, wherein said pointing device is activated when the first letter in a name of a required TV channel is indicated.

19. A TV system comprising:

a CPU and a monitor for displaying a list of TV channels, and having an indicator for indicating in a first mode of operation, number of a selected TV channel when a user directs a pointing device at said selected channel in said list of TV channels, and for indicating in a second mode of operation, the first letter in a name of the selected TV channel when the user directs the pointing device at said selected TV channel in said list of TV channels.

20. The system of claim 19, wherein said list of TV channels is arranged in order of channel numbers in the first mode of operation, and in order of channel names in the second mode of operation.

* * * * *